US006206435B1

(12) United States Patent
Le Clinche

(10) Patent No.: US 6,206,435 B1
(45) Date of Patent: Mar. 27, 2001

(54) QUICK COUPLING DEVICE FOR COUPLING A TUBE TO A RIGID ENDPIECE

(75) Inventor: Pascal Le Clinche, Rennes (FR)

(73) Assignee: Legris, S.A., Rennes (FR)

(*) Notice: Subject to any disclaimer, the term of this patent is extended or adjusted under 35 U.S.C. 154(b) by 0 days.

(21) Appl. No.: 09/547,973

(22) Filed: Apr. 12, 2000

Related U.S. Application Data

(62) Continuation of application No. 09/244,531, filed on Feb. 4, 1999, now abandoned, which is a continuation of application No. 08/849,929, filed as application No. PCT/FR95/01562 on Nov. 27, 1995, now Pat. No. 5,895,078.

(30) Foreign Application Priority Data

Nov. 30, 1994 (FR) .................................................. 94-14357

(51) Int. Cl.⁷ .................................................. F16L 37/086
(52) U.S. Cl. .......................... 285/305; 285/317; 285/323; 285/328
(58) Field of Search .................................. 285/305, 308, 285/319, 323, 317, 328

(56) References Cited

U.S. PATENT DOCUMENTS

| 5,314,216 | 5/1994 | Umezawa . |  |
|---|---|---|---|
| 5,711,550 | * 1/1998 | Brandt ................................. | 285/319 |

FOREIGN PATENT DOCUMENTS

| 9212228 | * 11/1992 | (DE) . |
|---|---|---|
| 4241817 | * 6/1994 | (DE) . |
| 2705430 | * 11/1994 | (FR) . |
| 8100747 | * 3/1981 | (WO) . |

* cited by examiner

Primary Examiner—Dave W. Arola
(74) Attorney, Agent, or Firm—Salzman & Levy

(57) ABSTRACT

A coupling device has a female part secured to a rigid endpiece. A stepped bore is provided that presents a large diameter section beyond an axial latch that is movable between two positions. A banding ring is housed in a removable manner inside the large diameter section and fitted on its inside surface with at least one retaining projection. The projection is used to axially link the tube to the banding ring by biting into the outside surface of the tube. An axial latch has two positions: one opposing axial displacement of the banding ring away from the rigid endpiece, the other releasing the banding ring.

6 Claims, 3 Drawing Sheets

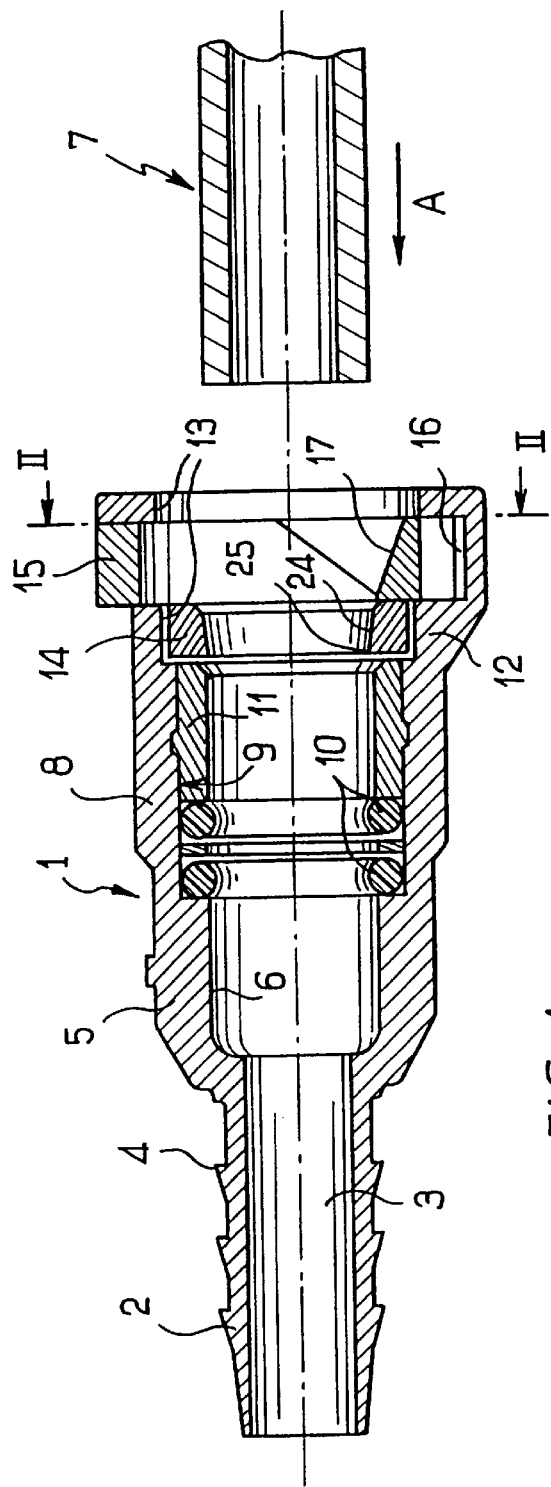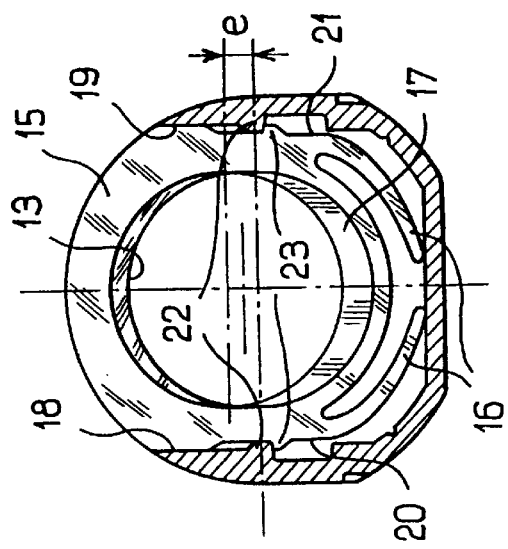

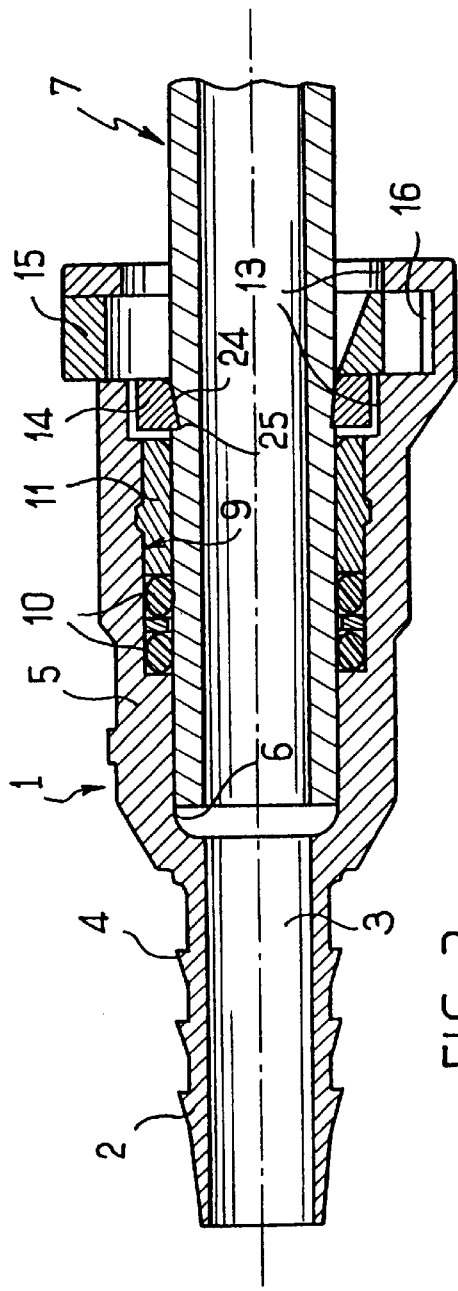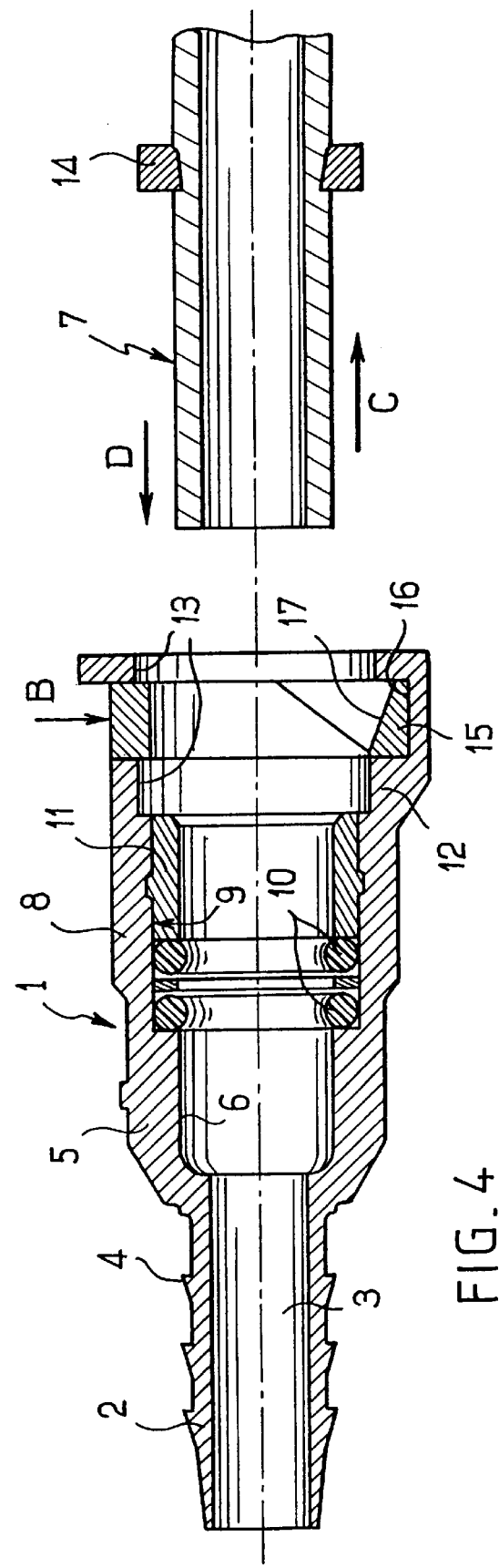

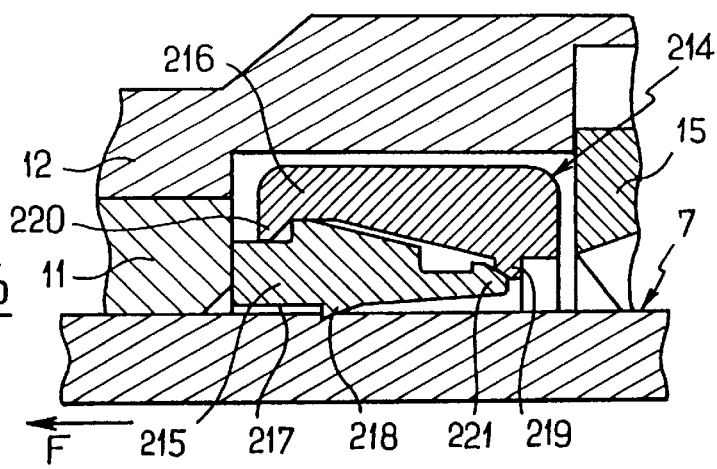
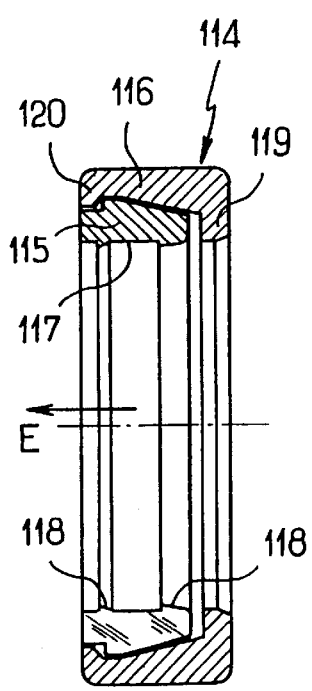
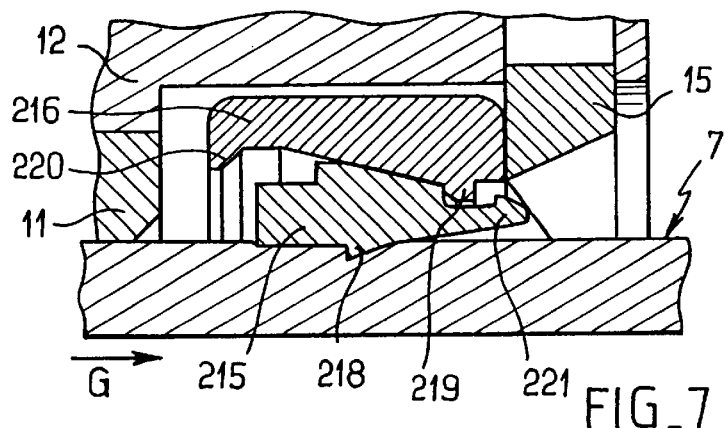
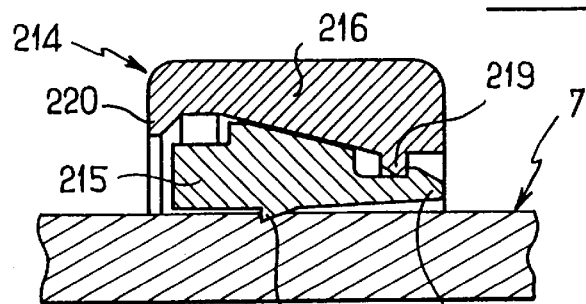
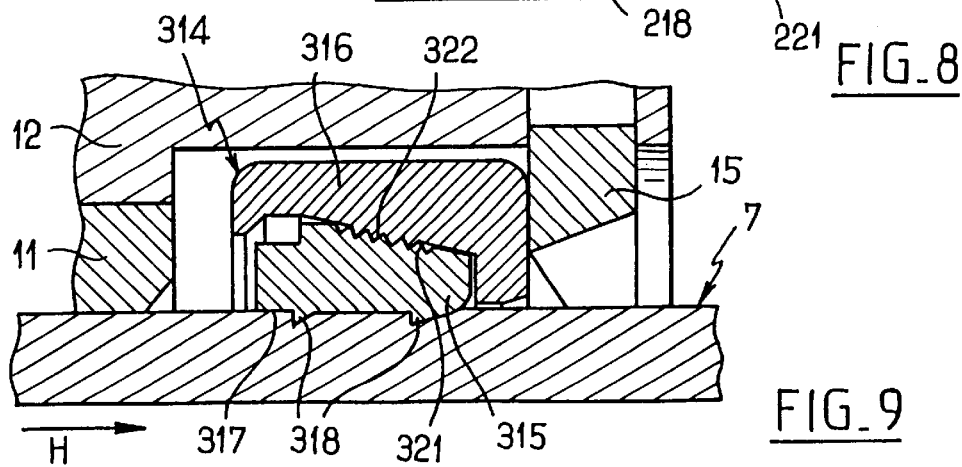

QUICK COUPLING DEVICE FOR COUPLING A TUBE TO A RIGID ENDPIECE

This application is continuation of application Ser. No. 09/244,531 filed Feb. 4, 1999, abandoned, which is a continuation of Ser. No. 08/849,929 filed May 29, 1997, now U.S. Pat. No. 5,895,078 issued Apr. 20, 1999 which is a 371 of PCT/FR 95/01,562 filed Nov. 27, 1995.

FIELD OF THE INVENTION

The present invention relates to a quick coupling device for coupling a tube to a rigid endpiece.

BACKGROUND OF THE INVENTION

To connect a tube to an installation or to connect two tubes to each other, it is known to use rigid endpieces of the spigot type having Christmas-tree shaped teeth, in which the rigid endpiece possesses a cylindrical tubular portion fitted on its outside surface with catching sharp edges that retain the tube and that seal the connection once the cylindrical portion has been forced into the tube. The main drawback of such a device lies in difficulties associated with assembly and disassembly. In order to guarantee good retention and good sealing, the teeth must be of sufficient height to bite properly into the inside surface of the tube, and as a result hand assembly becomes extremely difficult since it is necessary to develop large engagement forces, and disassembly becomes practically impossible because the teeth penetrate into the inside wall of the tube and their substantially radial surfaces oppose a force tending to pull them out.

In certain applications, it is nevertheless useful to be able periodically to make and break connections between a tube to a rigid endpiece easily and by hand. This can be made easy by significantly reducing the height of the teeth, however that is to the detriment of the quality of retention and of sealing achieved between the endpiece and the tube.

To remedy this drawback, is it known to band the tube, once installed on the endpiece, with at least one collar or ring that is placed on the outside of the tube and that is clamped thereon by appropriate means.

Such devices provide mechanical qualities that are satisfactory, however connection and disconnection operations require enough time to operate the clamping means. Further, when connection and disconnection are frequent, the indentations formed repetitively by the collar in the tube end up by damaging the outside surface thereof and can lead to a weakening in the retention provided by the banding collar on the tube.

Quick coupling devices are also known for coupling a tube to a rigid endpiece, which devices comprise a female part secured to the rigid endpiece and a male tubular part fitted to the end of the tube to be coupled. The female part has a stepped bore including a large diameter portion capable of receiving a shoulder of the male part beyond an axial latch. The male part generally has an elongate portion with a cylindrical outside surface fitted with retention projections (e.g., Christmas-tree shaped teeth) for providing non-dismountable connection between the tube and the male part.

With that kind of device, initial coupling takes place in two stages. The tube must first be fitted on the male part and this requires large engagement force since the clamping must be strong enough to ensure that the connection is leakproof. Thereafter, the male part must be inserted into the female part until the shoulder of the male part has gone past the axial latch of the female part, with the connection being sealed by means of O-rings disposed between the two parts. The tube is disconnected by acting on the axial latch so as to decouple the male part from the female part.

That kind of device thus makes it possible to perform frequent connections and disconnections without damaging the mechanical qualities of the coupling formed. However, the structure comprising two separate male and female parts is inconvenient in use and initial coupling requires special tooling and handling for the purpose of engaging the tube on the male part.

U.S. Pat. No. 5,314,216, issued to UMEZAWA for THIN RESIN TUBE CONNECTING COUPLING WITH FLANGE INSERT, discloses a coupling provided with a body having opposed front and rear ends. A large diameter chamber extends into the rear end and a communication hole extends into the front end. A small diameter chamber connects the communication hole and the large diameter chamber. A split annular grip with an inwardly directed annular pawl is disposed in the small diameter chamber and is dimensioned for surrounding the tube. All of the components inserted in the staged bore are extracted therefrom, with the tube. In other words, the banding ring is not extracted by itself, as it is in the present invention. The banding ring cannot move with respect to the latch, with or without a tube. In the present invention, however, the banding ring may or may not pass the latch, depending on the radial position thereof.

SUMMARY OF THE INVENTION

The present invention seeks to provide a quick coupling device of the above-specified type which is simple and compact in structure and which is extremely simple to implement, in particular on the occasion of initial coupling.

To achieve this end, the invention provides a quick coupling device for coupling a tube to a rigid endpiece including a female part secured to the rigid endpiece and in which a staged bore is provided that presents a section of large diameter beyond an axial latch that is movable between two positions, the device comprising a banding ring housed in removable manner in the large diameter section and fitted on its inside surface with at least one retaining projection forming axial connection means between the tube and the banding ring by biting into the outside surface of the tube, the axial latch in one of its two positions opposing axial displacement of the banding ring away from the rigid endpiece and, in its other position, releasing the banding ring.

Thus, the device is in the form of a part that is compact, the banding ring being integrated in the female part. On initial coupling, when the tube is inserted into the female part, the retaining projection of the banding ring fixes the ring permanently on the tube. This insertion can be performed by hand insofar as clamping of the banding ring on the tube does not serve to provide sealing, with sealing being provided directly between the female part and the tube. The axial latch prevents the tube from being disconnected by opposing axial displacement of the banding ring away from the rigid endpiece. To disconnect the tube fitted with its banding ring, it suffices to release the axial latch to allow the banding ring to pass and disconnect the tube which remains fitted with its banding ring. If it is desired to recouple the tube to the endpiece, it then suffices to slide the tube fitted with its ring inside the female part until the ring has gone past the axial latch. After the latch has been engaged, the tube is again prevented from moving axially inside the female part.

The banding ring may have a conical bore that converges towards the rigid endpiece and that has a small diameter that is smaller than the outside diameter of the tube, or it may have a cylindrical bore that is fitted with at least one retaining tooth.

In an advantageous embodiment, the banding ring comprises a split ring mounted in a cage which cooperates with the split ring via a conical contact surface that diverges towards the rigid endpiece.

It is then advantageous for the banding ring to include means for locking the split ring in at least one of the axial positions of said ring relative to the cage.

BRIEF DESCRIPTION OF THE DRAWINGS

Other characteristics and advantages of the invention appear on reading the following description of a particular and non-limiting embodiment given with reference to the accompanying drawings, in which:

FIG. 1 is an axial section view through a first embodiment of a connection device of the invention;

FIG. 2 is a cross-section on line II—II of FIG. 1;

FIG. 3 is a view analogous to FIG. 1 showing the device in operation;

FIG. 4 is a view analogous to FIG. 1 showing the device in a disconnected state, after initial coupling;

FIG. 5 is a detail section view on an axial plane through a first variant embodiment of the banding ring;

FIG. 6 is a fragmentary view of a second variant embodiment of the banding ring, showing how the tube is inserted on initial coupling;

FIG. 7 is a view analogous to FIG. 6, showing the state of the banding ring when an extraction force is exerted on the tube;

FIG. 8 is a view analogous to FIG. 6, showing the state of the banding ring when secured to the tube; and FIG. 9 is a view analogous to FIG. 7, showing a third variant embodiment of the banding ring.

DETAILED DESCRIPTION OF THE PREFERRED EMBODIMENT

With reference to the figures, and in particular with reference to FIGS. 1 to 3, the coupling device comprises a female part 1 integrally formed with a rigid endpiece 2 having an inside channel 3, and outside means 4 referred to as "Christmas-tree-like" teeth, suitable for being inserted into a tube (not shown).

In addition to the rigid endpiece 2, the female part 1 is subdivided into a plurality of portions. A first portion 5 comprises a bore 6 of a diameter that is designed to receive the tip of a tube 7 for coupling to the rigid endpiece 2. A second portion 8 of the female part 1 has a bore 9 of larger diameter than the bore 6 for receiving two O-rings 10 together with an insert 11 for locking the O-rings in place. The inside diameter of the insert and the inside diameter of the O-rings are respectively equal to and slightly smaller than the diameter of the bore 6. Finally, the female part 1 includes a third portion 12 whose bore 13 has a diameter that is even larger than that of the preceding bores so as to allow a banding ring 14 to pass freely.

At its end open to the outside, i.e., remote from the rigid endpiece 2, the third portion 12 of the female part 1 has an axial latch for preventing the ring 14 being extracted once properly inserted in the female part 1. This latch is constituted by a locking ring 15 capable of sliding radially in an open housing in the female part 1. As can be seen more clearly in FIG. 2, the locking ring 15 has two resilient outer tabs 16 which tend to displace the inside bore of the locking ring 15 relative to the axis of the bore 13. The portion of the inside bore of the locking ring 15 which is situated adjacent to the tabs 16 is in the form of a conical surface 17 converging towards the rigid endpiece 2.

The radial housing for the locking ring 15 in the female part 1 is shown in FIG. 2. It is defined laterally by two parallel flanks 18 and 19 against which there bear flats 20 and 21 of the locking ring 15. The flanks 18 and 19 have respective projections 22 constituting sliding abutments for projections 23 carried by the lateral flats 20 and 21 of the locking ring 15. These pairs of projections thus oppose withdrawal of the locking ring 15 from its housing under the effect of the resilient tabs 16 that keep the bore of the locking ring 15 offset by a value e relative to the bore 13. It may also be observed that the material used for the female part 1 and/or for the locking ring 15 is sufficiently resilient to enable the locking ring 15 to be inserted into its housing with the Christmas-tree shaped projections 22 and 23 sliding over one another.

The banding ring 14 has a conical bore 24 and is disposed inside the bore 13 so that the conical bore converges towards the rigid endpiece 2. In addition, the small diameter of the conical bore is slightly smaller than the diameter of the tube, whereas its large diameter is equal to or slightly greater than said diameter. In practice, best performance has been obtained with a conical surface having a half-angle at the apex lying in the range 2° to 6°, and preferably at an angle of 4° for a tube made of polyamide. For tubes of ordinary sizes, i.e., having an outside diameter lying in the range of a few centimeters to a few tens of centimeters, the best mechanical performance has been obtained for a difference of the order of a few tens of millimeters between the outside diameter of the tube and the small diameter of the banding ring 14.

On initial coupling of the tube 7 to the female part 1, the banding ring 14 is in place inside the bore 13. The tube 7 is inserted inside the female part 1 in the direction of arrow A in FIG. 1 by causing its outside surface to slide over the conical surface of the bore of the banding ring 14, the O-rings 10, and the bore 6. When the tube 7 reaches the end of its stroke, coupling has been completed. This is the state shown in FIG. 3.

To disconnect the tube 7 from the female part 1, it suffices to press the locking ring 15 against its resilient tabs 16, as shown by arrow B in FIG. 4. The banding ring 14 is then released and the tube 7 can be withdrawn, in the direction of arrow C.

To recouple the tube 7 in the female part 1, it suffices to cause said tube to penetrate together with its banding ring 14 into the female part 1, as symbolized by arrow D. As the banding ring 14 passes through the locking ring 15, the conical surface 17 forms a ramp for bringing the axes of the bore of the locking ring 15 and of the bore 13 back into alignment, with the locking ring 15 moving radially against the effect of the resilient tabs 16 until the banding ring 14 is received in the bore 13 beyond the locking ring 15. The tabs 16 are then released and the locking ring returns to its free position, i.e., its position that is eccentric relative to the bore 13, thereby constituting an abutment opposing extraction of the banding ring 14. The coupling is thus completed and the device is back in the configuration shown in FIG. 3.

FIG. 5 shows a first variant embodiment of the banding ring which is given reference 114 in this case. This ring comprises a split ring 115 mounted in a cage 116 which cooperates with the ring 115 via a conical contact surface that diverges towards the rigid endpiece 2. The split ring 115 also has a cylindrical inside bore 117 which is fitted with two circular ribs 118 that project into the ring 115 with an inside diameter that is slightly less than the outside diameter of the tube 7. In addition, at each of its axial ends, the cage 116 has respective inside shoulders 119 and 120 which limit axial displacement of the split ring 115 inside the cage 116.

During initial coupling of the tube to the rigid endpiece, the tube is inserted inside the banding ring 114 and slides against the circular ribs 118 of the split ring 115 pushing the split ring 115 back towards the rigid endpiece, as represented by arrow E in FIG. 5. Since the contact area between the ring 115 and the cage 116 is conical, this displacement causes the split ring 115 to enlarge, thereby facilitating insertion of the tube while preventing the outside surface of the tube being marked by the ribs 118. After the tube has been fully inserted into the female part of the device, any attempt at extracting the tube constrains the split ring 115 to move away from the rigid endpiece, i.e., in the direction opposite to arrow E. Such axial displacement is accompanied by shrinking of the split ring because of the conical shape of the contact surface between the ring 115 and the cage 116, thereby tending to strengthen the retention of the ring on the tube 7.

In FIGS. 6 to 8, there can be seen a fragmentary view of a second variant embodiment of the banding ring of FIG. 5. This banding ring is now given reference 214 and in the same manner as before it comprises a split ring 215 mounted in a cage 216. In this case the cage 216 has two shoulders 219 and 220 and the split ring 215 has a cylindrical inside bore 217 fitted with a singular circular tooth 218. The split ring 215 also includes a catch 221 cantilevered out forwardly facing the shoulder 219 of the cage 216. The catch 221 has a rounded end and the shoulder 220 has a ramp-forming shoulder for engaging said end.

On initial coupling of the tube 7 to the rigid endpiece, the tube 7 is inserted inside the banding ring 214 as represented by arrow F in FIG. 6. The outside surface of the tube slides against the tooth 218, thereby entraining the split ring 215 towards the shoulder 220 of the cage 216. Since the contact surface between the ring 215 and the cage 216 is conical, this axial displacement is accompanied by enlargement of the split ring 215 under the effect of its own resilience, thereby facilitating passage of the tube 7 and avoiding the outside surface thereof being marked by the tooth 218. After the tube 7 has been fully inserted inside the female part of the device, any extraction force applied to the tube 7 as symbolized by arrow G in FIG. 7 and due either to the tube 7 being put under pressure or to manually exerted force entrains the ring 215 together with the tube 7 by cooperation between the tooth 218 and the outside surface of the tube. When the cage 216 comes into abutment against the locking ring 15, the rounded end of the catch 221 slides over the chamfer of the shoulder 219 and the catch 221 deforms elastically. Once the catch 221 has gone past the shoulder 219 it springs back under the effect of its own elasticity into its free position. Simultaneously, since the contact surface between the ring and its cage is conical, axial displacement of the ring 215 is accompanied by tightening of the ring, thereby reinforcing the retention of the ring 215 on the tube 7. The banding ring 214 is then in a configuration shown in FIG. 7. When the extraction force on the tube 7 is interrupted, the resilience of the split ring 15 tends to return it towards the shoulder 220. However, the catch 221 now constitutes an abutment against axial sliding of the ring 215 in this direction, as shown in FIG. 8. Thus, the split ring 215 continues to be clamped on the tube 7, thereby ensuring retention on the banding ring 214 on the tube 7, even when the assembly constituted by those two elements is extracted from the female part 1 of the device.

FIG. 9 shows a fragmentary view of a third embodiment of the banding ring. In this case the ring is given reference 314, and as before it comprises a split ring 315 mounted inside a cage 316, with the two rings having a contact surface that is substantially conical. The ring 315 has a cylindrical bore 317 fitted with two circular teeth 318. In addition, the split ring 315 is also fitted in this case on its conical outside surface with a set of teeth 321. In like manner, the conical inside surface of the cage 316 is fitted with a set of teeth 322 that co-operates with the set of teeth 321 on the split ring 315. Any extraction force applied to tube 7, as symbolized by arrow H in FIG. 9, entrains the ring 315 and tube 7 by the engagement of the teeth 318 with the outer surface of the tube 7.

Thus, after the tube 7 has been fully inserted into the female part 1 of the device, any extraction force on said tube causes the split ring 315 to move axially inside the cage 316 and thus causes it to be tightened on the tube. Such axial displacement takes place by relative sliding between the set of teeth 321 and the set of teeth 322, such that the displacement and thus the clamping of the ring 315 on the tube are not reversible.

The invention is not limited to the embodiments described above, but on the contrary it extends to any device that uses equivalent means to reproduce the essential characteristics specified above.

What is claimed is:

1. A quick coupling device for coupling a tube to a rigid endpiece including a female part secured to said rigid endpiece, and in which a staged bore is provided that presents at least a section of large diameter having an end remote from said rigid endpiece, said female part being permanently provided with an axial latch, radially movable between two transverse positions with respect to said bore, and located at said end of said section, said quick coupling device further comprising a banding ring loose fitted in the large diameter section and having at least one internal projection for biting into an outside surface of the tube, when inserted into the female part, the axial latch in one of its two positions opposing axial displacement of the banding ring away from the rigid endpiece and, in its other position, releasing the banding ring, and further wherein said banding ring includes a cage, a split ring mounted in said cage, said cage cooperating with the split ring via a conical contact surface that diverges towards the rigid endpiece.

2. The quick coupling device according to claim 1, wherein the banding ring has a conical bore converging towards the rigid endpiece and having a small diameter that is smaller than the outside diameter of the tube.

3. The quick coupling device according to claim 1, wherein the banding ring has a cylindrical bore fitted with at least one anchoring tooth.

4. The quick coupling device according to claim 1, wherein the banding ring includes means for locking the split ring in at least one of the axial positions of said ring relative to the cage.

5. The quick coupling device according to claim 4, wherein the means for locking the banding ring comprises a catch secured to the split ring and cooperating with an inside shoulder of the cage.

6. The quick coupling device according to claim 4, wherein the locking means for locking the banding ring has sets of teeth formed on the containing surfaces of the inner and outer rings to cooperate with each other.

* * * * *